United States Patent [19]

Clem

[11] Patent Number: 5,367,282

[45] Date of Patent: Nov. 22, 1994

[54] ELECTRIC MOTOR PROTECTOR SENSOR

[75] Inventor: Thomas A. Clem, Woonsocket, R.I.

[73] Assignee: Texas Instruments Incorporated, Dallas, Tex.

[21] Appl. No.: 918,712

[22] Filed: Jul. 21, 1992

[51] Int. Cl.⁵ ............................................. H01C 7/10
[52] U.S. Cl. ................... 338/22 R; 338/26; 338/28
[58] Field of Search .............. 338/22 R, 225 D, 25, 338/28, 26; 374/172, 179, 183, 185, 208

[56] References Cited

U.S. PATENT DOCUMENTS

| | | | |
|---|---|---|---|
| 3,085,216 | 4/1963 | Melton | 338/28 |
| 3,246,183 | 4/1966 | Slonneger | 310/68 |
| 3,312,108 | 4/1967 | Avery | 338/22 R |
| 3,441,893 | 4/1969 | Gordon | 338/26 |
| 3,646,494 | 2/1972 | Waseleski, Jr. et al. | 338/25 |
| 3,824,328 | 7/1974 | Ting et al. | 338/22 R X |
| 4,437,084 | 3/1984 | Clayton, Jr. | 338/22 R |
| 4,445,109 | 4/1984 | Naganoma et al. | 338/22 R |
| 4,449,035 | 5/1984 | Schwob | 338/28 X |
| 4,644,316 | 2/1987 | Takeuchi et al. | 338/22 R |
| 4,789,850 | 12/1988 | Sepso et al. | 338/25 |
| 4,841,274 | 6/1989 | Yagher, Jr. et al. | 338/28 |
| 5,058,195 | 10/1991 | Knepler | 338/28 X |

Primary Examiner—Marvin M. Lateef
Attorney, Agent, or Firm—Russell E. Baumann; Richard L. Donaldson; René E. Grossman

[57] ABSTRACT

An electric motor protector sensor contains a small thermistor of low thermal inertia contained in a high temperature dielectric covering member in which electrical insulated lead wires are connected to opposite sides of the thermistor and extend out of the cover member to a current source to supply electrical current to the thermistor. An electrically insulating, thermally conductive silicone elastomer is positioned around the thermistor and lead wires to absorb forces on the sensor thereby protecting electrical contact between the lead wires and damage to the thermistor. Additionally, the lead wires can be twisted as extending out of the cover member and covered with another sleeve covering to provide improved protection against lead wire separation from thermistor surface electrical contact.

14 Claims, 1 Drawing Sheet

ELECTRIC MOTOR PROTECTOR SENSOR

BACKGROUND OF THE INVENTION

This invention relates to an electric motor protector sensor, and more particularly, an electric motor protector sensor positioned in the motor windings of a sealed compressor motor.

It is known in the art to use a motor protector sensor using a thermistor disposed in an opening in a thin inner layer of insulating material to expose portions of the thermistor on opposite sides of the insulating layer, outer thin layers of similar insulating material are provided with copper foils which are deposited thereon. These outer insulating layers are arranged to sandwich the inner insulating layers, the deposited copper foils carried by the outer insulating layers typically are soldered to respective exposed portions of the thermistor on opposite sides of the inner insulating layer. The outer layer of the sensor are also bonded to the inner insulating layer around the copper foils for sealing the sensor. Stem portions of these deposited copper foils extend to edges of the insulating layers where they are electrically connected to appropriate conductors. In this arrangement, the copper foils not only serve as heat-collecting members but also serve as electrical leads extending from the thermistor. When these known sensors are located within motor windings, the heat-collecting copper foils readily conform to the winding configuration and cooperate with low thermal inertia of the thermistor to permit very rapid response of the sensor to rising motor temperatures thereby providing desired motor protection. Such sensors are described in U.S. Pat. Nos. 3,521,212 and 3,646,494 filed Jun. 21, 1968 and Jan. 23, 1970 respectively assigned to assignor of the instant application and incorporated herein by reference.

These sensors are still useful in many applications but are generally expensive to manufacture and subject to failure due to a break in electrical connection between the thermistor and the copper foil and external lead wires due to shock forces to the sensor or lead wire pull-out. Such a failure of the sensor can easily result in the loss of the entire motor winding.

SUMMARY OF THE INVENTION

Accordingly, an electric motor protector sensor of the present invention comprises a small thermistor of low thermal inertia contained in a high temperature covering member in which insulated electrical wire leads are connected to opposite sides of the thermistor and extend out of the cover member to an electrical circuit to connect the thermistor to the electrical circuit. An electrically insulating, thermally conductive elastomer is positioned around the thermistor and ends of the lead wires within the covering member to help absorb forces received by the sensor thereby protecting the integrity of the thermistor itself and the electrical contact between the lead wires and the thermistor.

In accordance with another aspect of the present invention, there is provided an electrical motor protector sensor comprising a small thermistor of low thermal inertia contained in a high temperature covering member in which insulated electrical wire leads are connected to opposite sides of the thermistor and extend out of the cover member to an electrical circuit to connect the thermistor to the electrical current. The wire leads extending from the covering are twisted around each other and a second high temperature covering with adhesive is formed around them to greatly improve the ability of the sensor to withstand lead wire pull-out.

In accordance with still another aspect of the present invention there is provided an electrical motor protector sensor comprising a small thermistor of low thermal inertia contained in a high temperature covering member in which insulated electrical wire leads are connected to opposite sides of the thermistor and extend out of the cover member to an electrical circuit to connect the thermistor to the electrical current. The wire leads extending from the covering are twisted around each other and a second high temperature covering with adhesive is formed around them to greatly improve the ability of the sensor to withstand lead wire pull-out. Further, an electrically insulating, thermally conductive elastomer is positioned around the thermistor and ends of the lead wires within the covering member to help absorb forces received by the sensor thereby protecting the integrity of the thermistor itself and the electrical contact between the lead wires and the thermistor.

It is an object of this invention to provide a novel and improved electric motor protector sensor which is highly reliable in operation. It is another object of this invention to provide a motor protector sensor which minimizes the effects of shock forces on it especially during assembly of the sensor in the winding. It is still another object of this invention to provide a motor protector sensor with improved protection against lead wire connection failure ("wire pull-out"). It is yet another object of this invention to provide a motor protector which is of simple, rugged and inexpensive design and construction.

Other objects, advantages and details of the motor protector sensor of this invention appear in the following detailed description of the preferred embodiments of the invention and from the drawings.

DETAILED DESCRIPTION OF THE INVENTION

Figure 1:
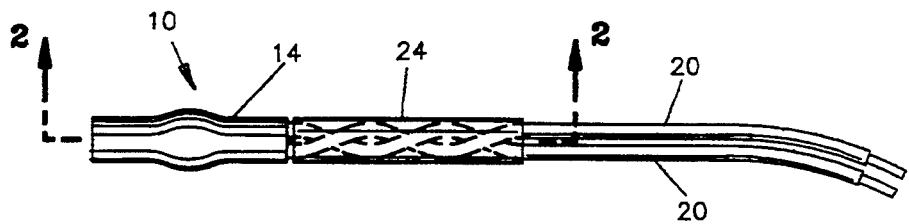
FIG. 1 is a plane view of the sensor of this invention.
Figure 2:
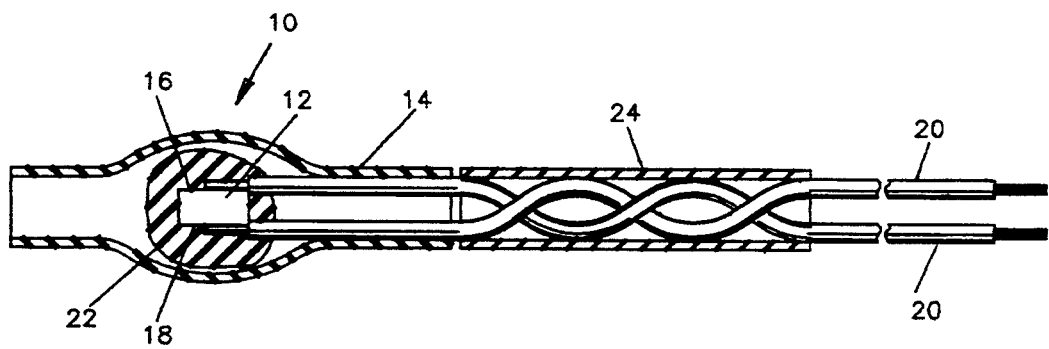
FIG. 2 is a section view along line 2—2 of FIG. 1.

Referring now to the drawings wherein the drawings are for the purposes of illustrating the preferred embodiments of the invention only and not for the purpose of limiting same. 10 in FIGS. 1 and 2 indicates the novel and improved electric motor protection sensor of this invention which is shown to include a thermistor 12 which preferably comprises a small pellet of semiconductive material having a selective positive or negative temperature coefficient of resistance. Preferably, the thermistor is adapted to display gradually changing electrical resistance in response to change of thermistor temperature within a selected range and is then adapted to display a much more rapid change in electrical resistance in response to further change of temperature. Preferably, for example, the thermistor embodies a lanthanum/yttrium-doped barium titanate, barium strontium titanate, barium lead titanate or the like. The size of the thermistor is preferably very small so that the thermistor displays low thermal inertia but the size of the thermistor in the sensor can vary within the scope of this invention in accordance with the electrical parameters of the motor control system in which the sensor is to be used. A practical thermistor useful in sensors finding wide commercial application comprises a pellet of lanthanide-doped barium titanate 0.050 inches in length and 0.070 inches in diameter. However, other thermistors of the same material ranging in length from 0.020 to 0.060 inches and ranging in diameter from 0.050 to 0.080 inches are also useful in many applications. Typically, such ceramic thermistors are brittle and cannot withstand large impact forces.

In accordance with this invention, the thermistor 12 is held in a covering member 14 which typically is a sleeve or tubular member of electrically insulating material. This material is capable of withstanding substantially elevated temperatures to which the material might be exposed in an overheating electric motor. For example, preferred insulating material for this purpose is a flexible radiation cross-linked polyvinylidine fluoride such as sold commercially under the tradename "Kynar". Other materials useful in insulating covering 14 include a polyamide resin sold under the tradename "Kapton", a polyethylene tetraphthalate sold under the tradename "Mylar", or a fluorinated aliphatic hydrocarbon such as tetrafluoroethylene sold under the trademark "Teflon". In an embodiment of the sensor of this invention, the thin covering or tube member of the sensor typically has a thickness of in the range of 0.006 to 0.020 of an inch and the tubing is heat shrinkable for forming around the thermistor 12.

In accordance with this invention opposite top and bottom surfaces 16 and 18 respectively of the thermistor 12 have elongated leads 20 electrically connected respectively to them for supplying electrical current to the thermistor sensor as part of a motor protection circuit, as for example, as described in U.S. Pat. No. 4,281,358 incorporated herein by reference. For example, the leads 20 comprise silver or tin-plated copper wires covered with Teflon and are soldered to the thermistor surface with pure tin, lead-tin or gold-tin solder material.

In accordance with this invention, thermistor 12 and the end portion of elongated leads 20 are surrounded in the thin tubular covering with flexible energy absorbing coating material 22 made from a cured elastomer such as a thermally conductive, electrically insulating silicone elastomer. The elastomer must be flexible enough to distribute forces uniformly across the ceramic surface and also absorb impact energy which would otherwise be transferred directly to the brittle thermistor element. Further, the elastomer must have high thermal conductivity so as to allow the sensor to maintain appropriate fast thermal response during motor overheating. Typical properties of such material are:

Hardness: 70–90 (shore A, points)
Elongation: 50–75%
Thermal Conductivity: $1.5$–$6.0 \times 10^{-3}$ (cal/° C.-cm-sec)
Thermal Expansion: $1.5$–$2.6 \times 10^{-4}$ (in/in/° C.)
Dielectric Strength: 400–600 (volts/mil)

A specific example of such a material is a Dow Corning thermally conductive silicone elastomer member Q3-6605. This flexible energy absorbing coating 22 greatly protects the thermistor against damage due to external mechanical forces, especially present during assembly and installation of the motor and housing.

In accordance with another embodiment of this invention, a second sleeve or tube 24 is provided adjacent covering member 14. The sleeve 24 is preferably separate from covering member 14 and is of a flexible electrically insulating material with an adhesive lining. An example of suitable material is heat shrinkable KYNAR with adhesive on the inner diameter of the sleeve. The leads 20 are preferably twisted several times as shown in FIG. 2 prior to applying the sleeve 24 which creates helical crevices into which the adhesive can flow during the heat shrinking of the sleeve. This second sleeve after being heat shrunk around the leads 20 greatly increases the ability of the sensor device to withstand lead pull-out.

In assembly of the sensor, the two elongated leads 20 have one respective distal end soldered to either top or bottom surface of thermistor 12. The leads further are twisted one around the other near the end of the leads attached to the thermistor top and bottom surfaces. A second sleeve 24 is positioned over at least a portion of the twisted leads. Thermally conductive electrically insulating silicone elastomer is then positioned around the thermistor and attached leads, and then the covering sleeve 14 is placed over the thermistor with a portion of the covering extending past the end of the thermistor. This entire package is then heated to cure the silicone elastomer and to heat shrink the first sleeve and the second sleeve with adhesive. The heating temperature for the material described above should be approximately 180° C. which is below the standard melt temperature for the solder used to attached lead wires to the thermistor. The resulting sensor has the two sleeves heat shrunk to seal the end of the leads, the elastomer material and the thermistor element.

Figure 3:
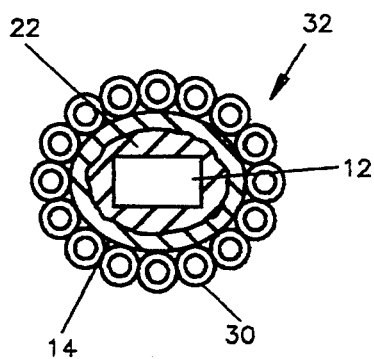
FIG. 3 is a diagrammatic view illustrating use of the sensor within a motor winding.

This rugged sensor is then positioned within the insulated convolutions 30 of a motor winding 32 as shown in FIG. 3. That is, because the sensor is thin and flexible, the sensor interleaves readily between insulated convolutions 30 of the motor windings 32 to be able to accurately respond to the temperature of the windings.

The sensor of the present invention has an additional advantage that, should the sensor be used in a pressurized environment, the sensor is not adversely effected by temporary loss of pressure conditions in the environment. That is, if pressurized gas from the sensor environment should enter the insulating cover of the sensor despite its generally sealed nature, the cured elastomer forms another protection barrier to protect the bond of the leads to the thermistor so as not to be effected by pressurization cycles. In this way, it is found that the sensor 10 of this invention is especially adapted for use in pressurized environments.

It should be understood that a preferred embodiment of this invention has been described by way of illustration but that all modifications and equivalents thereof which fall within the scope of the appended claims are included within the scope of this invention. For example, although the leads 20 are shown to be of round configuration, these leads could be narrow and flat throughout their length or could be flattened at their point of connection to the thermistor 12. Other modifications which might assist in assembly of the sensor 10 are also within the scope of this invention if they fall within the scope of the appended claims.

I claim:

1. A sensor for an electric motor comprising a thermistor with selected temperature coefficient of resistance properties, said thermistor having opposite surface portions for connection to an electrical circuit, a covering member of electrically insulating material in which said thermistor is contained, a pair of elongated electrically conductive lead members secured in electrically conductive relation to the thermistor surface portions and extending out from said cover member, and an electrically insulating, thermally conductive elastomer having a thermal conductivity of between $1.5-6.0 \times 10^{-3}$ (cal/°C.-cm-sec) positioned around the thermistor within the covering member for protecting the thermistor from external forces and maintaining the integrity of the electrical contact between the lead members and the thermistor while providing good heat transfer to the thermistor.

2. A sensor according to claim 1 wherein said thermistor displays a selected temperature coefficient of resistance over a selected temperature range and displays a relatively different temperature coefficient of resistance over another selected temperature range.

3. A sensor according to claim 1 wherein said covering member is capable of withstanding elevated temperatures and is heat shrinkable for encasing the thermistor ends of the lead members.

4. A sensor according to claim 3 wherein said covering has a thickness of between 0.006 and 0.020 of an inch and is made from a material selected from the group consisting of a radiation cross-lined polyvinylidine fluoride, a high temperature polyamide resin, a polyethylene tetraphthalate and tetrafluoroethylene.

5. A sensor according to claim 1 further including a sleeve member adjacent said covering member for encircling said lead members to improve the ability of the sensor to withstand lead member pullout.

6. A sensor according to claim 5 wherein said lead members extending from said cover member are twisted around each other thereby creating crevices between the wires and said sleeve member is made from an electrically insulating material with an adhesive for adhering to the lead members and flowing into said crevices when heated.

7. A sensor according to claim 1 wherein said electrically insulating, thermally conductive elastomer is heat curable.

8. A sensor according to claim 7 wherein said thermally conductive elastomer has the properties of:
Hardness: 70–90 (shore A, points)
Elongation: 50–75%
Thermal Conductivity: $1.5-6.0 \times 10^{-3}$ (cal/°C.-cm-sec)
Thermal Expansion: $1.5-2.6 \times 10^{-4}$ (in/in/°C.)
Dielectric Strength: 400–600 (volts/mil).

9. A sensor for an electric motor comprising a thermistor with selected temperature coefficient of resistance properties, said thermistor having opposite surface portions for connection to an electrical circuit, a covering of electrically insulating material in which said thermistor is contained, a pair of elongated electrically conductive lead members secured in electrically conductive relation to the thermistor surface portions and extending out from said cover member, and a sleeve member of electrically insulating material adjacent but separate and spaced apart from said covering member only encircling and engaging said lead members to improve the ability of the sensor to withstand lead member pull-out.

10. A sensor comprising a thermistor with selected temperature coefficient of resistance properties, said thermistor having opposite surface portions for connection to an electrical circuit, a covering of electrically insulating material in which said thermistor is contained, a pair of elongated electrically conductive lead members secured in electrically conductive relation to the thermistor surface portions and extending out from said cover members, said lead members extending from the cover member being twisted around each other thereby creating crevices between the wires, and a sleeve member of electrically insulating material adjacent but separate from said cover member for encircling and engaging said lead members having an adhesive lining for adhering to the lead members and flowing into said crevices when heated to improve the ability of the sensor to withstand lead member pull-out.

11. A sensor according to claim 10 further including a thermally conductive elastomer positioned around said thermistor within the covering member for protecting the thermistor from external forces and maintaining the integrity of the electrical contact between the lead members and the thermistor while providing good heat transfer to the thermistor.

12. A sensor according to claim 11 wherein said thermally conductive enclosure has the properties of:
Hardness: 70–90 (shore A, points)
Elongation: 50–75%
Thermal Conductivity: $1.5-6.0 \times 10^{-3}$ (cal/°C.-cm-sec)
Thermal Expansion: $1.5-2.6 \times 10^{-4}$ (in/in/°C.)
Dielectric Strength: 400–600 (volts/mil).

13. A sensor according to claim 12 wherein said sensor is heated after assembly to cure said thermally conductive elastomer and to sealingly secure said sleeve to said lead members and said covering to said elastomer and said thermistor.

14. A sensor for insertion into the motor windings of a motor comprising a thermistor with selected temperature coefficient of resistance properties, said thermistor having opposite surface portions for connection to an electrical circuit, a heat shrinkable covering member of high temperature electrically insulating material in which said thermistor is contained, a pair of elongated electrically conductive lead members secured in electrically conductive relation to said thermistor surface portions and extending out from said cover member, at least a portion of said lead members extending out from said cover member being twisted around each other thereby creating crevices between the wires, a sleeve member of heat shrinkable high temperature electrically insulating material with an adhesive lining for adhering to the lead members and flowing into said crevices when heated, and a heat curable flexible thermally conductive electrically insulative elastomer positioned around the thermistor within the covering member for protecting the thermistor from external forces and maintaining the integrity of the electrical contact between the lead members and the thermistor while providing good heat transfer to the thermistor.

* * * * *